(12) United States Patent
Schultheiss

(10) Patent No.: US 7,691,324 B2
(45) Date of Patent: Apr. 6, 2010

(54) METHOD AND REACTOR FOR THE NON-THERMAL DECOMPOSITION AND PASTEURIZATION OF ORGANIC PROCESS MATERIALS BY ELECTROPORATION

(75) Inventor: Christoph Schultheiss, Pfinztal (DE)

(73) Assignees: Südzucker AG, Mannheim/Ochsenfurt (DE); Forschungszentrum Karlsruhe GmbH, Karlsruhe (DE)

( * ) Notice: Subject to any disclaimer, the term of this patent is extended or adjusted under 35 U.S.C. 154(b) by 1330 days.

(21) Appl. No.: 10/783,875

(22) Filed: Feb. 20, 2004

(65) Prior Publication Data

US 2004/0166019 A1 Aug. 26, 2004

Related U.S. Application Data

(63) Continuation-in-part of application No. PCT/EP02/09328, filed on Aug. 21, 2002.

(30) Foreign Application Priority Data

Sep. 10, 2001 (DE) .......................... 101 44 486

(51) Int. Cl.
| | |
|---|---|
| *B08B 17/00* | (2006.01) |
| *A61L 2/00* | (2006.01) |
| *B01J 19/08* | (2006.01) |
| *C12N 13/00* | (2006.01) |
| *C12M 1/00* | (2006.01) |
| *C25D 5/14* | (2006.01) |
| *C25D 11/20* | (2006.01) |
| *B01D 17/06* | (2006.01) |
| *A23C 3/07* | (2006.01) |
| *A21D 6/00* | (2006.01) |

(52) U.S. Cl. ................ 422/22; 422/1; 422/6; 422/23; 422/186; 422/905; 422/907; 422/186.04; 422/186.21; 422/186.22; 422/186.23; 435/173.1; 435/289; 435/173.7; 435/283; 435/287.1; 435/288.7; 435/300; 205/701; 205/742; 205/183.1; 205/157; 205/660; 210/748; 210/764; 210/749; 210/243; 99/451; 426/237; 426/238; 426/244

(58) Field of Classification Search .................. 422/1, 422/6, 22–23, 186, 905, 907, 186.04, 186.21, 422/186.22, 186.23; 435/173.1, 289, 173.7, 435/283, 287.1, 288.7, 173.4, 173.5, 173.6, 435/172.2, 173.3, 287, 300, 317, 173, 817; 205/701, 742, 299 R, 183.1, 180.1, 157.15, 205/158.2, 164, 554, 227, 660; 210/748, 210/764, 749, 243; 99/451; 426/237–238, 426/244

See application file for complete search history.

(56) References Cited

U.S. PATENT DOCUMENTS

| | | | |
|---|---|---|---|
| 3,265,605 A | | 8/1966 | Doevenspeck |
| 3,679,556 A | * | 7/1972 | Doevenspeck .............. 204/269 |
| 4,305,000 A | * | 12/1981 | Cheever .................. 250/492.3 |
| 5,098,843 A | | 3/1992 | Calvin |
| 6,093,432 A | * | 7/2000 | Mittal et al. ................ 426/237 |
| 6,117,660 A | | 9/2000 | Walters et al. |
| 6,403,348 B1 | | 6/2002 | Rubinsky et al. |

FOREIGN PATENT DOCUMENTS

| | | | |
|---|---|---|---|
| DE | 195 34 232 | | 3/1997 |
| DE | 198 59 459 | | 6/2000 |
| DE | 19859459 | * | 6/2000 |
| EP | 1 243 339 | | 9/2002 |

OTHER PUBLICATIONS

K.H. Schoenbach, "Bacterial Decontamination of Liquids with Pulsed Electric Fields", J. Bioelectromagnetics, vol. 7, No. 5, Oct. 2000.*

English translation of the description section of "Bacterial Decontamination of Liquids with Pulsed Electric Fields", J. Bioelectromagnetics, vol. 7, No. 5, Oct. 2000.*

\* cited by examiner

Primary Examiner—Jill Warden
Assistant Examiner—Monzer R Chorbaji
(74) Attorney, Agent, or Firm—Klaus J. Bach

(57) ABSTRACT

In a reaction chamber, which constitutes a component of a process installation for obtaining foodstuffs or foodstuff components, biological products in harvested form that are whole or in pieces are subjected to pulsed electric fields as they pass through said reaction chamber, said electric fields forming pores in the cell walls so as to irreversibly open the latter, thus making the content of the cells more easily accessible. This is achieved by electrode groups, which can be energized to a high voltage and are located in the wall of a longitudinal passage of the reactor through which the process material is moved past grounded electrodes located in an opposing longitudinal wall area. Each electrode group is connected to an electric energy accumulator such as for example, a Marx generator, by means of a switch, in order to rapidly establish electric fields of multiple directions between the charged and the grounded electrodes.

3 Claims, 2 Drawing Sheets

● grounded electrodes

✚ high voltage electrodes

METHOD AND REACTOR FOR THE NON-THERMAL DECOMPOSITION AND PASTEURIZATION OF ORGANIC PROCESS MATERIALS BY ELECTROPORATION

This is a Continuation-in-Part Application of international application PCT/EP02/09328 filed Aug. 21, 2002 and claiming the priority of German application 101 44 486.9 filed Sep. 10, 2001.

BACKGROUND OF THE INVENTION

The invention relates to a method for the decomposition of biological cells in an industrial process with pulsed electrical fields and a reactor in a processing line for performing the method.

Pulsed electrical fields with field strengths in the range of 1-100 kV/cm generate irreversible pore openings in the membrane of biological cells. This effect, which is called electroporation, is used for efficiently providing access to the content of plant cells and for killing microorganisms and for pasteurizing.

Other methods for the release of cytoplasm are the thermal treatment or pressing. At about 72° C., the cells membranes of plant cells denature such that the cell content is released. By compression, the outer pressure results in the rupture of the cells walls and the release of the cell content. Both classical processes have grave disadvantages: The thermal treatment consumes a relatively large amount of energy and damages the cell content. The mechanical compressing requires relatively expensive apparatus and the degree of the decomposition is generally lower than with thermal decomposition. A combination of two processes resides in cold-pressing and a subsequent dissolution of the cell content by solvents.

The electroporation process has been known since the sixties of the last century and since then the phenomenon of permeabilization or, respectively, poration of cell membranes is being scientifically examined. DB 12 37 541 describes the electroporation for common agricultural products such as the decomposition of starch in potatoes.

WO99/6463 discloses another electroporation method. The advantages of this method in the processing of sugar beets before the beets are thermally or mechanically further processed are shown. In this case, the thermal treatment reflects the state-of-the-art. The mechanical process is also described in DE 197 36 000 A1.

In the field of electroporation, no method and no apparatus or respectively reactor is known which permits processing on an industrial scale.

It is, therefore, the object of the present invention to provide a method for the electroporation of cellular biological materials and also a reactor in a process line for performing the method.

SUMMARY OF THE INVENTION

Instead of turning the fruits or products by a turbulent medium flow or turbulence induced in the process material stream, electric fields are provided in the reactor, which are oriented differently over the length of the reactor. In the state of the art, for example, the fruits are transported in a dielectric tube, which is provided with angularly displaced pairs of electrodes which are disposed on top of each other in adjacent cross-sectional planes. With respect to the beets passing by, the angles are varied in a particular plane and the cells oriented in this particular plane are electroporated. However, the cells oriented with their long axis, that is, z-axis, normal to this plane are not destroyed.

The invention solves the object to modify biological cells by means of pulsed electroporation in such a way that processing can take place on an industrial scale. That is, large volumes are processed in a reactor designed for that purpose and operated by the method with minimal energy consumption.

With the method for the continuous decomposition and pasteurization of such large amounts of biological cells in plants, roots, knots, fruits and animal cells, that is, the organic process material, the material is moved in a flow medium through the reactor and, for electroporation, is subjected in the reactor, to pulsed electric fields.

The individual steps are:

Between grounded electrode groups which comprise each at least one electrode which is installed in the dielectric reactor wall and which can be energized by a high voltage in a passage area of the reactor, pulsed electrical fields E of multiple directions and of a strength are generated such that each cell passing the reactor is subjected with high probability at least once to an electric field strength E such that also along the long axis thereof at least once the threshold potential difference $$zE = 10\,V$$

for the electroporation is achieved. As a result, the biological cells of process material which have an elongated, for example oval shape, of a size of typically 10-100 μm, are subjected repeatedly to a potential difference of at least 10 V.

The electrodes which can be energized by a high voltage are combined in groups of at least one electrode and the electrodes of each group are concurrently energized by a high voltage or, respectively, a high voltage pulse, but only one group is energized by a high voltage at a time.

The electrode groups are energized by a high voltage subsequently, like in a running fire, with a time-dispersion corresponding up to a multiple pulse length such that the field is always generated by a single electrode group. The travel direction of the high voltage exposure area can be in the flow direction of the processed material or in the opposite direction but the electrode groups are statistically energized so that, based on the electrode arrangement, in the reactor from the entrance to the exit, the direction of the electric field strength E is constantly changed in the rhythm of the high voltage energization of the groups. It is essential that always only one electrode group is energized by high voltage. In this way, mutual field displacements and, consequently, areas with field lines extending normal to the flow axis, as they would occur with a concurrent energization of two or several electrode groups are avoided. Based on the length of the electrical action, the running fire direction is preferably in the flow direction of the process material since, then, the process material is exposed to the electrical action for a longer period as it moves in the same direction.

Experimental parameter examinations as well as American literature sources (K. H. Schoenbach et al.), "Bacterial Decontamination of Liquids with Pulsed Electric Fields", IEEE Transactions on Dielectrics, Vol. 7, No. 6, p. 637-645, October 2000) suggest to provide a duration of each high voltage pulse in the range of 1 to 3 μsec at a threshold potential difference of 10V. This appears to be energetically advantageous for the decomposition of the process material. It is advantageous in this connection if the voltage increase is as steep as possible but does not take longer than 100 μsec.

The grounded electrodes are not correlated with one particular high voltage electrode or group of electrodes. Rather a high voltage electrode or group of high voltage electrodes co-operates with the spatially closest grounded electrodes by forming, when energized by a high voltage, a strong field with the closest grounded electrode or group of electrodes and a correspondingly weaker field with the more distant grounded electrodes. This results in the reversal effect or, respectively, a spatial fluctuation of the electric fields. The field strength increase generally occurring at the grounded electrodes and the electrode group being momentarily at a high voltage potential in comparison with the field strength in the intermediate area provides for electroporation also in the area of the more remote grounded electrodes (see in this connection also the description concerning FIG. 5, Field Strength Distribution).

In addition to the effect of the field strength increase at the more distant grounded electrodes, the electric field strength is also increased in the nearby area by a factor 10. In this way, it is ensured that in the area of the more distant grounded electrodes, the cells material is reliably electroporated.

In the area of the adjacent electrodes threshold potential differences of 100 V and more are generated. It has been found that, with such "over potentials", the pulse time must be less than 1 µsec. A comparison between the decomposition quality at a shell potential difference of 10 V and 100 V shows, with the same specific energy consumption, an advantage in favor of the latter. The electric energy storage of the respective electrode group should be discharged rapidly by way of the respective switch. The respective discharge circuit is therefore so dimensioned that the voltage increase to the maximum of at most 1 MV occurs in not more than 100 µsec.

The reactor for decomposing and pasteurizing, that is, for an optimal performance of the method of electroporation is constructed as follows:

The reactor is tunnel-shaped and has a polygonal, but at least square, cross-section or a round cross-section. The wall material is dielectric and chemically inert with respect to the process liquid and the process material carried along thereby. In a first longitudinal area of the reactor wall grounded electrode are installed over the length of the reactor, which, with their front/head are exposed to the reactor chamber.

In a second longitudinal area of the reactor wall, electrodes which can be energized by a high voltage are installed which are also exposed with their front/head to reactor the interior of the reactor chamber. They are divided generally into groups of at least one such high voltage electrode. The electrodes of one group are connected to the same high voltage source. Each group of high voltage electrodes has its own voltage source.

All the groups of high voltage electrodes are so arranged that the distance between adjacent groups corresponds about to the inside width d of the reactor.

The longitudinal area of the high voltage electrode group is separated from the longitudinal area of grounded electrodes at both sides by an area without any electrodes. This area has over the length of the reactor such a width that, during processing, between the grounded electrode and the momentarily energized electrode group, a field strength of 10 kV/cm is established that is no electric breakdown occurs.

The longitudinal area including grounded electrodes is positioned relative to the longitudinal area including the high-voltage electrode groups such that each straight line connection between a grounded electrode and a high voltage electrode of any group extends in the open area of the reactor. In the reactor design, a ratio of the open width to the reactor depth d is maintained such that the distance between the higher location electrodes of a group and the next grounded electrode is such that no stray fields with <10 kV occur in the process material.

For a large reactor, it is advantageous for a certain limitation of the field strength, instead of energizing a single electrode energized with high voltage, to energize groups of electrodes with high voltage at the same time. The high voltage electrodes may be divided into groups of at least four electrodes and each group is connected by way of a high voltage cable and a switch or spark gap with its own high voltage source or Marx generator.

The electrodes which, with their front surface are disposed in the interior wall and are in direct contact with the transport or processing liquid have, for generating a field in the reactor interior, the following area sectioning:

The sum of the surface areas of the high voltage electrodes exposed in the reactor is about the same as the sum of the surfaces of the adjacent grounded electrodes and is not substantially less if the next following grounded electrode is also taken into account. Herein, the electrode area is to be so dimensioned that the aspect ratio of the electrode surface area to the distance d between the respective high voltage electrode and the corresponding grounded electrodes do not exceed the value:

$$F:d = \frac{1}{2} \text{ cm}$$

The electrolytic current density should be about equal. An even greater aspect ratio results in even more homogeneous field strength distributions but increases the electrolytic losses to a larger degree.

The electrodes are distributed over the respective longitudinal area of the reactor in such a way that there is no electrode pair of a grounded and a high voltage whose straight connecting line extends normal to the flow direction of the process material or, respectively, normal to the transport axis in the reactor, claim 3. Consequently, none of the electrode groups, when projected normal to the flow direction of the process material or respectively, normal to the transport axis overlaps a grounded electrode. In this projection, the grounded electrodes are disposed always around an electrode group, but in such a way that there is always access between the nearby electrodes to the more distant electrodes for the formation of an electric field.

Concerning the treatment time, it has been found that, if the electrodes are so distributed over the respective longitudinal area that, in the projection of the longitudinal area with the high-voltage electrodes normal to the flow direction onto the longitudinal area of the grounded electrodes, the high voltage electrodes are disposed on a closed, simply curved line or a line section thereof about a grounded electrode (or also with a reversed projection), the treatment time can be substantially reduced.

In contrast to the thermal and mechanical methods mentioned earlier, pulsed electrical fields with field strengths in the area of 1-100 kV/cm destroy cell membranes irreversibly. The electroporation is suitable for a more effective harvesting of the content of the cytoplasm of biological cells and for the destruction of microorganisms. In this process, pores are formed in the cell membrane; they grow and are again closed under the influence of thermal fluctuations and local electric fields. For a model, it is assumed that hydrophilic water-non-permeable cell membranes with pores suitable for material exchange are formed in a two-stage process. The pores appear first as water non-permeable hydrophobic pores whose rate of formation depends on the temperature and the membrane potential. When their radius reaches a critical value, they become hydrophilic pores. These can grow under the influence of an electric field. When their radius exceeds during the pulses a second critical value the opening becomes irreversible. The time scale within which the pores are opened is in the area of a microsecond. The outer electric field needs to be applied only over this period. If excessively high field strengths are applied, starting at 10 kV/cm, this period may be reduced.

Each increase of the pulse duration beyond the point in time where the cell membrane is destroyed increases only the unavoidable electrolytic losses in the suspension. As a result for achieving very high field strengths over large distances for only microseconds, voltage pulses of many 100 kV amplitude are required and, for achieving a high treatment rate, a high repetition frequency of the pulses is necessary.

For such an apparatus, the service life of the impulse generators must comply with industrial standards. The properties are obtainable with Marx generators. Pulse transformers for such short time processes cannot be built at reasonable cost and are therefore uneconomical.

In the Marx generator, first, high voltage condensers are charged in parallel to a charge voltage of for example 50 kV and are then switched in series in order to sum up the individual voltages. With, for examples, ten condensers an amplitude of 500 kV is obtained upon switching of the discharge. The further parameters are determined with the aid of the time constant τ of the switched electric current with $\tau = RC < 1 \mu s$.

R is essentially the resistance of the suspension of water and the biological cells and C represents the capacities of the serially switched condensers of a Marx generator. Inductive R-L members are in this arrangement comparatively small and are therefore negligible.

For a usable industrial operation of the reactor, Marx generators must be used as the voltage source for the electroporation. Sugar beets for example are effectively electroporated with an external field strength of 10 kV/cm if the serially switched Marx generator generates pulses of 500 kV and the reactor has an open width of 50 cm. Although the field strength of 10 kV/cm is very high, generally only a part of the beet cells are decomposed. For the others, the externally applied field strength is not sufficiently high. The reason is that biological cells are in most cases elongated. For a model definition, a long z-axis and a short r-axis based on the cell shape are used. If the cell is arranged with its longitudinal z axis for example parallel to the local field direction a potential difference is established along the z-axis which is $U = zE$, which provides for electroporation. The situation is different along the short axis of cells where a smaller potential $U = 2rE$ is effective assuming that r is about the radius of the elongated cell. An oval cell with for example the dimensions $z = 100 \mu m$ and $2r = 10 \mu m$ is to be electroporated. With a field strength of 1 kV/cm and a pulse duration of microseconds, the electroporation threshold which in this case is cell substance specifically 10 V is not reached because $2rE = 10 \mu m \times 1 kV/cm = 1 V$.

A cell oriented such that its short axis extends parallel to the field lines will therefore survive. If the field and long axis of the cell would have been oriented in the same direction, the irreversible opening of the membrane would have been achieved.

For pulses in the microsecond range, the threshold for irreversible electroporation is at a potential difference of about 10 V. This threshold, but also shielding effects by anisotropic current flow result in the fact, that, to ensure electroporation the field strengths applied are excessive, that is, threshold potential differences in the area of 100 V are used and, additionally, the fruit must be rotated into different positions, in order to increase the probability of achieving electroporation of the cells.

Below the invention will be described in greater detail on the basis of the accompanying drawings which in FIGS. 1-5 schematically show a sample reactor with rectangular cross-section.

DESCRIPTION OF A PREFERRED EMBODIMENT

Measurements with beets, oriented on the electric field generated in the reactor have shown that the specific energy, based on a beet, of 8 kJ can be reduced to about 2 kJ/kg if all the cells are involved in the electroporation. In addition to the incomplete electroporation in a tube arrangement, also the transport of whole fruits in the tube was found to be disadvantageous, since canting and wedging of the process material may occur which results in blockages that must be manually eliminated. Therefore the present invention prefers a material transport wherein a continuous transport force is applied to the fruits as this occurs for example in connection with a chain conveyor.

The through-put of a chain conveyor is determined by the conveyor speed, the width, the height and the degree of filling. Depending on the biological cell material, the height of the conveyor is about 50 cm; the transport speed is so adjusted that the specific energy supplied by the high voltage pulses reaches the desired threshold value during the residence period of the goods in the reactor. The width of the reactor is not subject to limitations.

In the present case, the reactor has a rectangular cross-section and consists of a dielectric material of sufficient strength as far as any requirements are concerned. The movable parts such as the conveyor belt with transverse ribs etc. also consist of a dielectric material. The height of the reactor is here about 50 cm, the length L is for example 200 cm and the width is 100 cm. The grounded electrodes are installed in the lower side, the upper side includes the high-voltage electrodes wherein each group of electrodes, which can be energized by a high voltage from a respective Marx generator, is shown here only as a single electrode. The distance between two grounded electrodes is 50 cm, which is also the distance between the high voltage electrodes.

Figure 1:
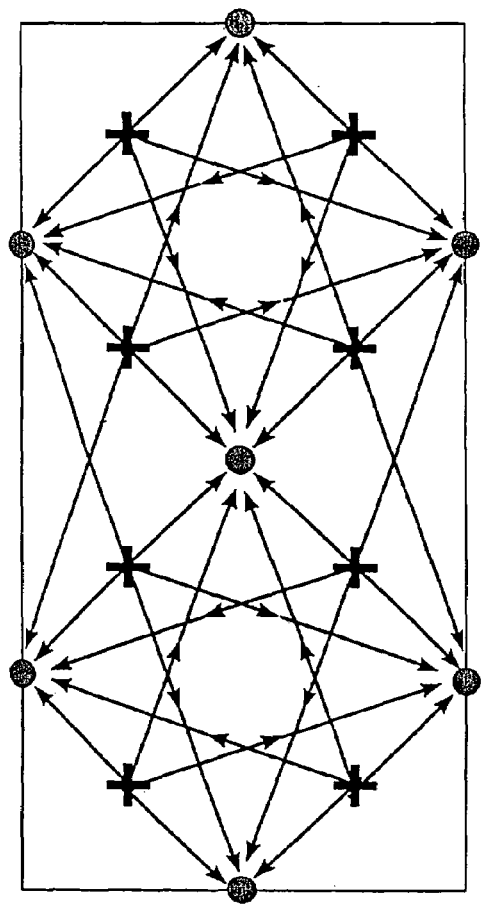
FIG. 1 is a top view of the according to the invention.

In FIG. 1, the electrode arrangement is shown in connection with a reactor. All dots represent the grounded electrodes. The high voltage electrodes are represented by crosses. They are displaced with respect to the grounded electrodes and rotated in such a way that they are arranged centered in the top view shown. At least the center row of grounded electrodes is covered by the dielectric belt of the chain conveyor which is not shown in the drawing. The conveyor belt is therefore foraminate in that area so that a field can be established through the openings between the two types of electrodes (the grounded and the high voltage electrodes) which is not disturbed by the relative dielectric constants of the chain conveyor material.

In this case, for example, eight Marx generators are provided that is the high voltage electrode groups, each consist of one electrode. The arrows shown in FIGS. 1-3 between the two electrode types indicate the direction of the locally effective electric field. From top view (as shown in FIG. 1) the side view (FIG. 2) and the front view (FIG. 3), it is apparent that the largest part of the open space in the reactor is crossed by the connecting lines extending in highly divergent directions. In this way, it is ensured that the process material passing through the reactor, that is, the beets and the transport liquid which, in this case, is water, are subjected at any location in the reactor to electric field lines extending in different directions.

For the dimensioning of the electrode surface area, it has to be considered that the electrolyte resistance caused by the current flow through the water bath and the fruit mass is not below the total resistance in accordance with the relationship $$\tau = RC < 1 \text{ µs},$$

since otherwise the pulse length becomes smaller than 1 µs and is not sufficiently long for electroporation as explained earlier.

For example, with an electrolytic resistance of about 1.5 mΩ/cm and an electrode distance of about 20 cm the disc-like electrodes should not exceed a diameter of about 30 mm; this results in an aspect ratio of electrode surface area to distance of about ½ cm. With greater aspect ratios, the homogeneity of the field strength is improved but the electrolytic losses increase at an even higher rate.

Figure 2:
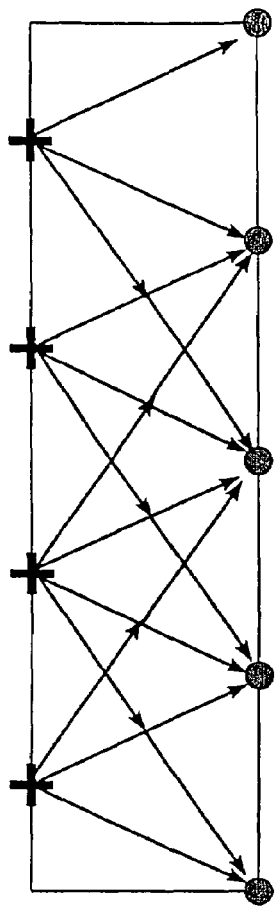
FIG. 2 is a side view of the reactor.
Figure 3:
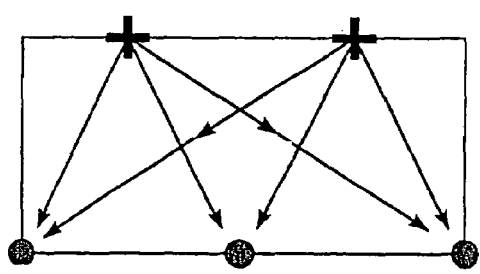
FIG. 3 is a front end view of the reactor.
Figure 4:
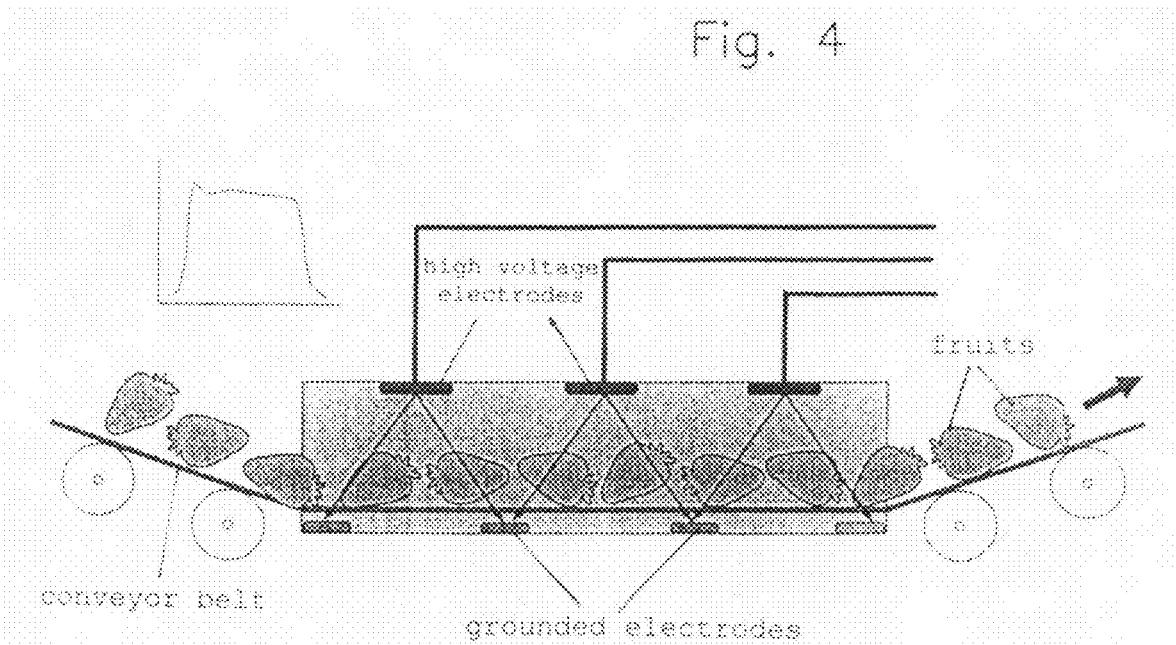
FIG. 4 shows schematically the reactor arrangement.

Care has to be taken that the electrode surface area is not too small. In such a case, the area of high field strength is displaced from the space between the electrodes to the direct surrounding of the electrodes which must be avoided (see FIG. 5). Upon dimensioning the electrode surfaces for a reactor as it is shown in FIGS. 1 and 2, it has to be considered that the high voltage electrodes have several grounded electrodes in their immediate vicinity. Therefore the closest adjacent grounded electrodes together should have the same surface area as the high voltage electrode.

Figure 5:
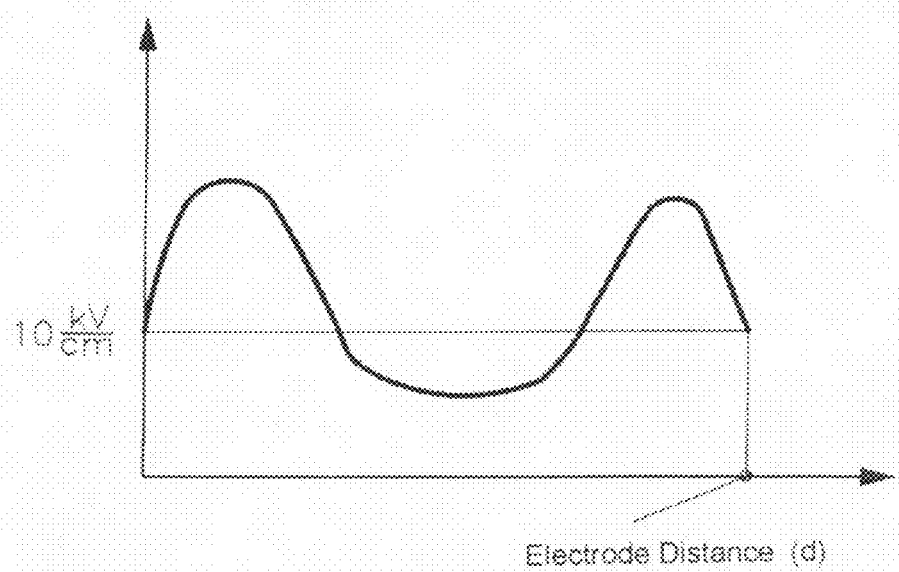
FIG. 5 shows a qualitative field strength distribution.

FIG. 5 shows on one hand, the electric field strength distribution between a just energized high voltage electrode and any of the grounded electrodes: There is an excessive field strength near the electrodes and a reduced field strength in the space therebetween. The field strength distortion is a function of the electrode surface areas. For very small electrode surface areas, the field strength in the intermediate space drops almost to zero. The same occurs if a small electrode is disposed opposite to a wall-shaped electrode, if for example the reactor housing consists of metal instead of a dielectric material. A high field line density would be established only in the immediate vicinity of the small electrode.

FIG. 5 shows qualitatively the electric field strength distribution between an electrode which has just been energized by a high voltage and any of the grounded electrodes. There is an excessive field strength near the electrodes and a reduced field strength in the space in between. The field strength distortion is a function of the electrode surface areas. For very small electrodes, the field strength in the space drops almost to zero. The same situation is present if a small electrode is disposed opposite a wall-shaped electrode, that is, if the reactor wall consisted of a metal instead of a dielectric material. A high field line density would be established only in the immediate vicinity of the small electrode. FIG. 5 additionally shows the field strength distribution normal to the electrode arrangement that is, in a direction which corresponds about to the flow direction in the reactor. The distribution illustrates the expansion of the field strength into the reactor volume and provides information concerning the field conditions with respect to a nearby electrode pair.

What is claimed is:

1. A method for the continuous non-thermal decomposition and pasteurization of industrial quantities of organic process material by electroporation, wherein the process material is carried through a reactor in, and with, a transport/processing liquid and is subjected therein to the effects of pulsed electric fields generated between grounded electrodes which are arranged spaced from one another flat along the walls of the reactor on one side of a longitudinal passage of the reactor and high voltage electrodes which can be energized by a high voltage and are arranged in spaced relationship flat along the walls of the reactor and an opposite side of the longitudinal flow passage of the reactor opposite the spaces between the grounded electrodes, said method comprising the steps of:

generating pulse-like electric fields only between the high voltage electrodes and the grounded electrodes by discharging an electric energy source connected to the respective high voltage electrodes by way of an associated switch without time-overlap with the other electrodes so that no electroporation field lines formed thereby and extending between any high voltage electrode and the grounded electrodes extend normal to the flow direction of the process material flowing through the longitudinal flow passage, charging the electric energy sources between two immediately successive discharges to such a level that, in the area between any high voltage electrode and the nearest grounded electrode, an electric field strength E is generated during the discharge whereby along the longitudinal axes (z) of any cell of the process material which is momentarily present in the electroporation field for the duration of at most 1 µs, a potential difference $$\Delta \phi_s = 10 \text{ V}$$

is exceeded for the irreversible fracture and opening of the cell walls of the process material.

2. A method according to claim 1, wherein between two immediately successive discharges the electric energy sources are charged to such an extent that, in the area between an electrode group and at least the nearest grounded electrodes, an electric field strength E is generated during the discharge such that, along the longitudinal axis of the cells, that is the main axis (z), of the process material which is momentarily present in this field area, a potential difference of $\Delta \phi \geq 100$ V is generated for a period of not more than 1 µs.

3. A method according to claim 2, wherein an electrode group including a Marx generator and a spark gap structure connected thereto are used, which are so dimensioned that the voltage increase to the voltage maximum of at most 1 MV takes not longer than 100 µsec.

* * * * *